United States Patent
Ben-Arie et al.

[19]

[11] Patent Number: 5,892,755
[45] Date of Patent: Apr. 6, 1999

[54] TRANSFER LAYER OF THE ATM TYPE AND METHOD FOR OPERATING A TRANSFER SWITCH

[75] Inventors: Yaron Ben-Arie, Ramat-Gan; Roni Eliyahu; Ronen Shtayer, both of Herzlia; Yehuda Shvager, Hashmonaim, all of Israel

[73] Assignee: Motorola, Inc., Schaumburg, Ill.

[21] Appl. No.: 768,013

[22] Filed: Dec. 13, 1996

[30] Foreign Application Priority Data

Feb. 26, 1996 [EP]  European Pat. Off. ............. 96102862

[51] Int. Cl.⁶ ................................................ H04L 12/56
[52] U.S. Cl. ............................................ 370/236; 370/413
[58] Field of Search ................................... 370/412, 413, 370/414, 417, 418, 395, 396, 236

[56] References Cited

U.S. PATENT DOCUMENTS

| | | | |
|---|---|---|---|
| 5,550,815 | 8/1996 | Cloonan et al. | 370/414 |
| 5,563,885 | 10/1996 | Witchey | 370/413 |
| 5,574,885 | 11/1996 | Denzel et al. | 370/417 |
| 5,687,324 | 11/1997 | Green et al. | 370/414 |
| 5,745,489 | 4/1998 | Diaz et al. | 370/412 |

*Primary Examiner*—Min Jung
*Attorney, Agent, or Firm*—Robert D. Atkins

[57] ABSTRACT

A transfer layer of an ATM type used between a switch (216) and a number N of communication channels (218). Each communication channel (218) has second storage arrangement $B_0, \ldots, B_{N-1}$ for storing cell queues having a length of up to P cells each, one of the second storage arrangements being in a busy condition if a minimum number M of cells is stored therein, where M is lesser of equal P. Each communication channel is assigned to one of the switch queues. The transfer layer (217) has third storage arrangement T for storage of a cell queue having a length of up to L cells. Furthermore the transfer layer (217) selectively disables the input of a cell from one of the switch queues into the third storage arrangement if the second storage arrangement is in a busy condition.

16 Claims, 5 Drawing Sheets

FIG. 3 —PRIOR ART—

TRANSFER LAYER OF THE ATM TYPE AND METHOD FOR OPERATING A TRANSFER SWITCH

FIELD OF THE INVENTION

The invention relates to a transfer layer of the type used between a switching means and a number of communication channels. Furthermore the invention relates to a method for operation of a transfer switch having a transfer layer of the same type.

BACKGROUND OF THE INVENTION

Transfer switches are mainly used for communication networks. There are several types of communication networks such as the ethernet, the token ring and the FDDI. Some networks use the asynchronous transfer mode telecommunications concept. This concept is particularly advantageous in the emerging field of high speed virtual networking.

The asynchronous transfer mode (ATM) has been chosen by standards committees as an underlying transport technology within many broadband integrated services digital network protocol stacks. In this context, "transport" refers to the use of ATM switching and multiplexing techniques at the data link layer to convey end—user traffic from source to destination within a network. A description of the standardised ATM telecommunications concept can be found in a publication of the ATM forum entitled "ATM user—network interface specification", 1993, published by PTR Prentice Hall.

FIG. 1 shows an example of an asynchronous transfer mode network. The ATM network itself is schematically depicted within the network region 1. The network region 1 contains the ATM switches 2, 3 and 4. The network region 1 might contain a high number of further transfer switches which are not depicted in the drawing. The transfer switches 2, 3 and 4 are interconnected via communication links 5, 6 and 7. Each of the communication links 5, 6 and 7 contains one or more transfer switches. Thereby a network is established.

By way of example it is shown in FIG. 1 that the private networks 11, 12 and 13 are connected via the communication links 8, 9 and 10 to the ATM network in the network region 1. Information is interchanged on such a network by means of so called cells. FIG. 2 shows the structure of such a cell according to the ATM standard. The cell carries a payload 14 which contains a piece of information to be transmitted via a virtual connection of the network. Furthermore the cell contains a cell header 15 which carries control information. According to the ATM standard the GFC field of the cell carries general flow control data, the VCI field contains a virtual connection identifier, the VPI field contains a virtual path identifier and the field PT identifies the payload type.

Further control fields are the CLP field which optionally indicates the explicit loss priority of the cell and the HEC field which is used for error correction purposes.

FIG. 3 shows a schematic diagram of a transfer switch of a type which could be used for the standardised ATM network. Transfer switches of the type as shown in FIG. 3 are well known in the prior art and are widely used for switching in networks. Transfer switches are used for transferring data cells which belong to virtual connections over physical links.

The transfer switch comprises a switch 16, a transfer layer 17 and communication channels 18. The switches themselves of switch 16 are not depicted in the drawing, but only the FIFOs $S_0$ to $S_{N-1}$. The N FIFOs $S_0, S_1, S_2, \ldots, S_{N-1}$ of the switch 16 are storage means for storage of a number N of switch queues. The switch queues serve to buffer the outputs of the switch 16

The FIFO $S_0$ contains the storage locations, $C_{01}, C_{02}, \ldots C_{06}$. Each of these storage locations has the capacity to hold a complete ATM cell (cf. FIG. 2). The same applies for the other FIFOs $S_1, S_2, \ldots S_{N-1}$ of the switch 16, especially for the storage cells $C_{N-1,0}$ and $C_{N-1,6}$. Each of the FIFOs $S_0$ to $S_{N-1}$ has the capacity to buffer 6 ATM cells. Hence a number N of switch queues each having a length of up to 6 cells can be stored in the FIFOs of the switch 16.

The output of each of the FIFOs $S_0$ to $S_{N-1}$ is connected via the cell bus 19 to the transfer layer 17. The transfer layer 17, comprises a FIFO 20 for storage of a cell queue having a length of up to L=6 ATM cells. The FIFO 20 receives ATM cells via the bus 19 from the switch queues which are realised in the FIFOs S of the switch 16 to perform ATM layer functions on these cells and feed them into the communication channels 18 according to the originating switch queue.

The FIFO 20 of the transfer layer 17 comprises the L=6 storage locations 21, 22, 23, 24, 25 and 26. Each of the storage locations 21–26 has the capacity to hold a complete ATM cell.

The output of the FIFO 20 is connected via the cell bus 27 to the communication channels 18. The cell bus can be of the type of an UTOPIA cell bus, as defined in "UTOPIA, an ATM-PHY interface specification", level 2, version 0.8, Apr. 10, 1995, published by the ATM forum. The transfer layer 17 can be realised by means of a micro processor, such as Motorola MC 92500.

The communication channels 18 comprise a number of N of physical lines $L_0$ to $L_{N-1}$. The lines $L_0$ to $L_{N-1}$ serve to establish so called physical layer (PHY) connections. Examples for such physical connections are the communication links 5, 6, 7 and 8, 9, 10 as shown in FIG. 1.

Each of the physical lines $L_0$ to $L_{N-1}$ is connected to an output buffer. In the example shown in FIG. 3 the output buffers $B_0, B_1, \ldots B_{N-1}$ are FIFOs. Each of the FIFOs $B_0$ to $B_{N-1}$ has 10 storage locations each of which having a storage capacity sufficient to hold a complete ATM cell. The output buffer $B_0$ has the storage locations $D_{01}, D_{02}, \ldots D_{0,10}$ whereas the FIFO $B_{N-1}$ has the storage locations $D_{N-1,0}, D_{N-1}, \ldots, D_{N-1,10}$. Hence, the storage means of the communication channels 18, which in this case are realised by means of FIFOs—can each hold an output cell queue having a length of up to P=10 cells. The cells are inputted to the FIFOs of the communication channels 18 via the cell bus 27 from the transfer layer 17.

Typically, in an ATM switching system there is a one to one relationship between the FIFOs $S_0$ to $S_{N-1}$ of the switch 16 and the FIFOs $B_0$ to $B_{N-1}$ of the communication channels 18: a cell which originates from FIFO $S_x$, where $0 \geq x > N$, is transferred via the bus 19, the FIFO 20 and the bus 27 to its corresponding FIFO $B_x$. In other words each of the physical lines $L_0$ to $L_{N-1}$ is unambiguously assigned to one of the FIFOs $S_0$ to $S_{N-1}$ of the switch 16 and vice versa.

The numbers indicated in the storage locations 21–26 of the FIFO 20 symbolise the origin of the cell which is at present stored in a specific storage location of the FIFO 20. For example the cell stored on storage location 21 originates from the FIFO $S_0$, the cell stored on storage location 22 originates from the FIFO $S_5$ (which is not shown in the drawing) and the cell stored on storage location 26 also originates from the FIFO $S_0$. Hence, FIG. 3 depicts a snap shoot of the operation of the transfer switch.

The invention seeks to provide an improved transfer layer and an improved transfer switch, such as an ATM switch, which allow a higher data transmission rate. Furthermore the invention seeks to provide an improved method for operating of a transfer switch.

SUMMARY OF THE INVENTION

According to the present invention there is provided a transfer layer adopted to be used between a switching means and a number N of communication channels, said switching means having first storage means for storage of a number N of switch queues, each of said communication channels having second storage means for storage of a cell queue having a length of up to P cells, each one of said second storage means being in a busy condition if a minimum number M of cells is stored therein, where M is lesser or equal P, each of said communication channels being assigned to one of said switch queues, said transfer layer comprising: third storage means for storage of a cell queue having a length of up to L cells and logic means for disabling input of a cell from one of said switch queues into said third storage means of said transfer layer if said second storage means of said assigned communication channel is in a busy condition.

Furthermore the invention provides for a transfer layer adopted to be used between a switching means and a number N of communication channels, said switching means having first storage means for storage of a number N of switch queues, each of said communication channels having second storage means for storage of a cell queue having a length of up to P cells, each one of said second storage means being in a busy condition if a minimum number M of cells is stored therein, where M is lesser or equal P, each of said communication channels being assigned to one of said switch queues, said transfer layer comprising: third storage means for storage of a cell queue having a length of up to L cells for each of said switch queues.

The invention also provides for a method for operating of a transfer switch, said transfer switch comprising switching means, a number N of communication channels and a transfer layer, each of said communication channels having storage means for storage of a cell queue having a length of up to P cells, each one of said storage means being in a busy condition if a minimum number M of cells is stored therein, where M is lesser or equal P, said method comprising the steps of: monitoring said storage means for an occurrence of said busy condition, disabling the input of a cell from said switching means to said transfer layer in response to said occurrence of said busy condition.

Furthermore the invention provides for a method for operating of a transfer switch, said transfer switch comprising switching means, a number N of communication channels and a transfer layer, said switching means having first storage means for storage of a number N of switch queues, each of said communication channels having second storage means for storage of a cell queue, each of said communication channels being assigned to one of said switch queues, said transfer layer comprising third storage means for storage of cell queues, each one of said cell queues being assigned to one of said communication channels and having a length of up to L cells, said method comprising the steps of: inputting cells from said switch queues into said assigned cell queues. The invention is particularly advantageous for switching systems which are compliant to the ATM standard.

The point of departure of the invention is the finding that the data transmission rate of a state of the art transfer layer, such as a standardised ATM layer, is limited by blockages which occur in the FIFO (cf. FIFO 20 in FIG. 3). Such a blocking in a prior art transfer layer occurs for example if the output buffer of a physical line is full and at the same time a cell is stored in the FIFO of the transfer layer at the beginning of the output queue for output to the same physical line. If for example—again with reference to FIG. 3—the output buffer $B_0$ of the physical line $L_0$ is full, the cell stored on storage location 21 in the FIFO 20 of the transfer layer 17 can not be outputted to the buffer $B_0$. As a consequence all the other cells which are stored on the storage locations 22–26 have to wait in the cell queue of FIFO 20 until the cell stored on storage location 21 is outputted to its corresponding buffer $B_0$. A situation of this kind will be referred to in the following as a "head-of-queue blocking situation".

Such a head of queue blocking situation does no longer occur in a transfer layer according to the invention. Basically the invention takes two different approaches:

The first approach is to increase the storage capacity of the storage means of the transfer layer so that for each of the switch queues a separate queue can be stored in the transfer layer. As a result, cells emerging from one of the switch queues $S_x$ are inputted in their corresponding cell queue in the transfer layer $T_x$. The cells which are outputted from the cell queue $T_x$ of the transfer layer are inputted exclusively into the assigned output buffer $B_x$ of the physical line $L_x$. In other words per output buffer $B_x$ of a physical line $L_x$ there is one dedicated cell queue in the transfer layer and in the switching means. If one of the output buffers, for example output buffer $B_0$ is full, the cells belonging to the output buffer $B_0$ are waiting in their transfer queue $T_0$ while other output buffers B can still be serviced by their respective transfer queues T of the transfer layer.

Even though a transfer layer implemented according to the first approach of the invention is ideal in terms of performance, a relatively large silicon space is required to implement such a transfer layer because of the high numbers of FIFOs which are needed in the transfer layer. This can be a disadvantage if the transfer layer is to be implemented in one single integrated circuit chip.

The second approach of the invention does only require the storage of one cell queue in the transfer layer as it is the case in the prior art. To prevent a head of queue blocking situation the input of a cell from a switch queue is disabled when the corresponding output buffer of the cell is full or almost full. The situation that an output buffer is full or almost full can be signalled by a "busy" signal for each of the output buffers.

According to a preferred embodiment of the invention the busy lines are connected to a logic of the transfer layer which disables the input of the cell from a switch queue when the corresponding output buffer of that cell is signalling a busy condition.

According to a further preferred embodiment of the invention the busy signal is already asserted by a buffer when its output queue still has L empty cells, where L is the maximum length of the transfer queue in the transfer layer. This has the advantage, that even in the worst case where all the cells in the transfer queue of the transfer layer belong to the same output buffer which has signalled a busy situation, this output buffer would still be capable of receiving the cells of the transfer queue without a blocking situation.

According to the ATM standard there has to be a continuous flow of cells in each of the physical lines. As a consequence, a situation where an output buffer is empty has to be prevented to guarantee that an ATM switch is in compliance with the ATM standard. According to one of the preferred embodiments of the invention an output buffer does no longer receive cells when the output buffer asserts its busy signal. When the busy condition is over the output buffer drops the busy signal so that new cells belonging to that output buffer can be transferred from the corresponding switch queue via the transfer layer to the output buffer.

However, this transfer requires a certain time interval. If the data transmission rate on the physical lines is very high this can cause the problem that the output buffer which has dropped the busy signal is already emptied when the new cells from the switch queue of that output buffer arrive since the time interval required for the transfer of the cells is longer than the time interval required to empty an output buffer which has dropped its busy signal. In order to prevent such a situation the busy signal is asserted by an output buffer when there is a minimum number of M cells in its output queue.

The number M is chosen so that the time intervals required to empty the output queue of M cells in the output buffer matches the time interval from the dropping of the busy signal by the same output buffer to the arrival of a new cell from the corresponding switch queue via the transfer layer.

BRIEF DESCRIPTION OF THE DRAWINGS

The invention will now be described by way of example and with reference to the accompanying drawings in which:

In FIG. 4 like reference numerals are used for parts of the transfer switch according to the invention which correspond to parts of the prior art transfer switch of FIG. 3 having added a leading "1" to the reference numerals. The transfer switch of the first embodiment of the invention shown in FIG. 4 comprises a switch 116 which has a set of FIFOs $S_0$ to $S_{N-1}$. The storage locations of the FIFOs of the switch 116 are referred to the same way as the storage locations of the switch 16 of FIG. 3.

Figure 1:
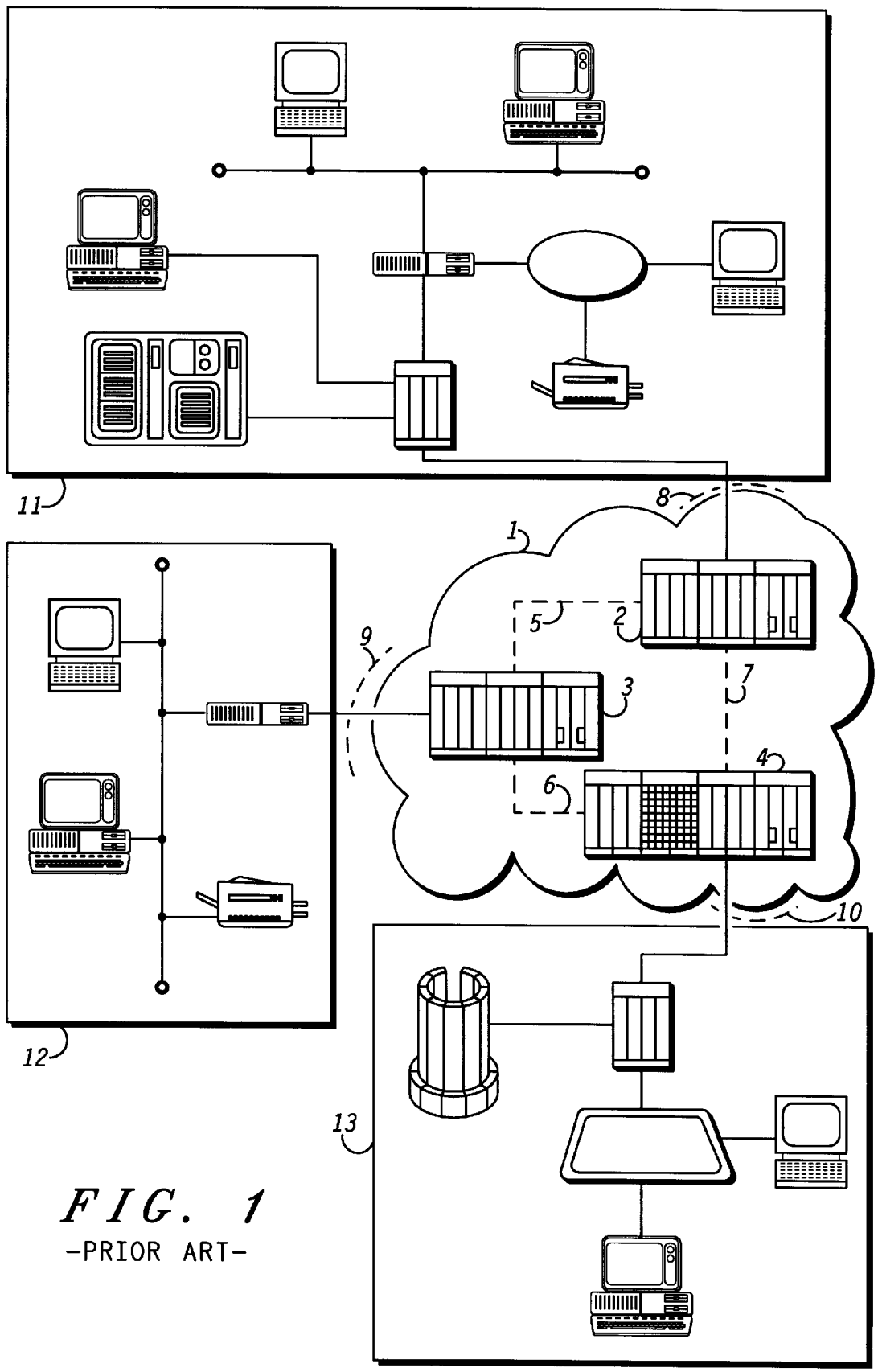
FIG. 1 is an example of a standard ATM network.
Figure 2:
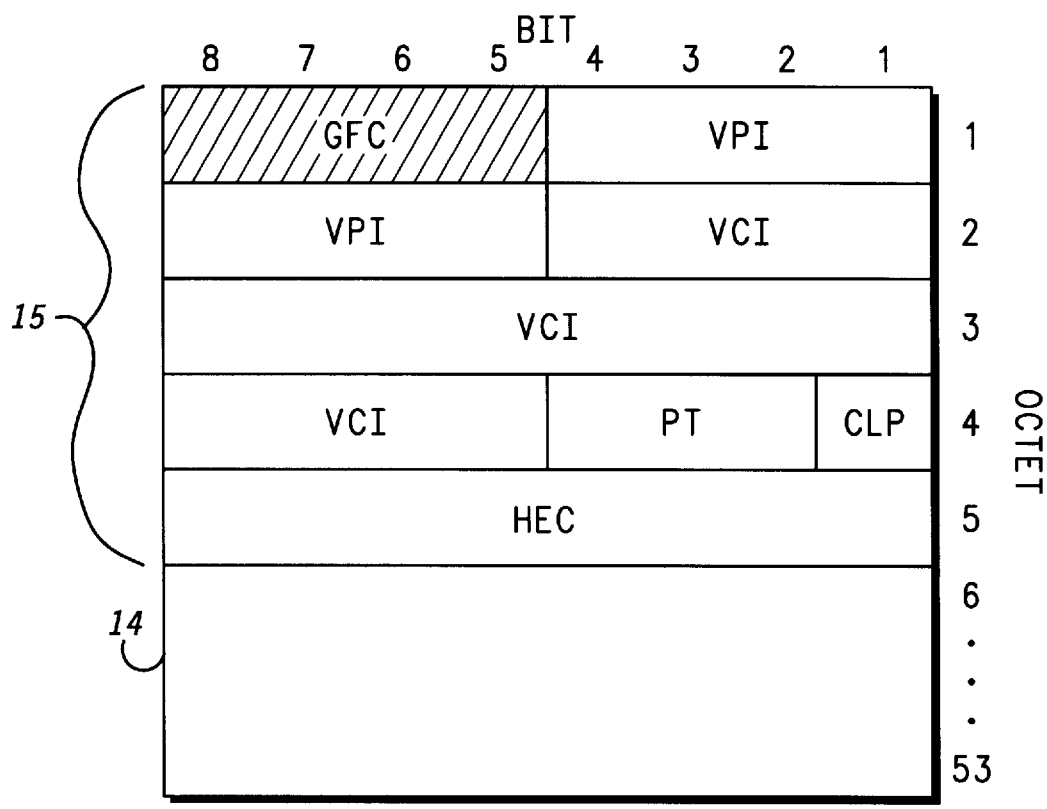
FIG. 2 is a diagrammatic presentation of a standard ATM cell.

The switch 116 is connected by a cell bus 119 to the transfer layer 117. The transfer layer 117 has a number N of FIFOs $T_0$ to $T_{N-1}$. The inputs of the FIFOs $T_0$ to $T_{N-1}$ are connected to the cell bus 119 whereas the outputs of these FIFOs are connected via a cell bus 127 to the communication channels 118. The communication channels 118 comprise a number N of physical lines, each physical line having its own output buffer. The physical lines and their output buffers as well as the storage locations within the output buffers are referred to the same way as the corresponding parts as communication channels 18 of FIG. 3.

Figure 4:
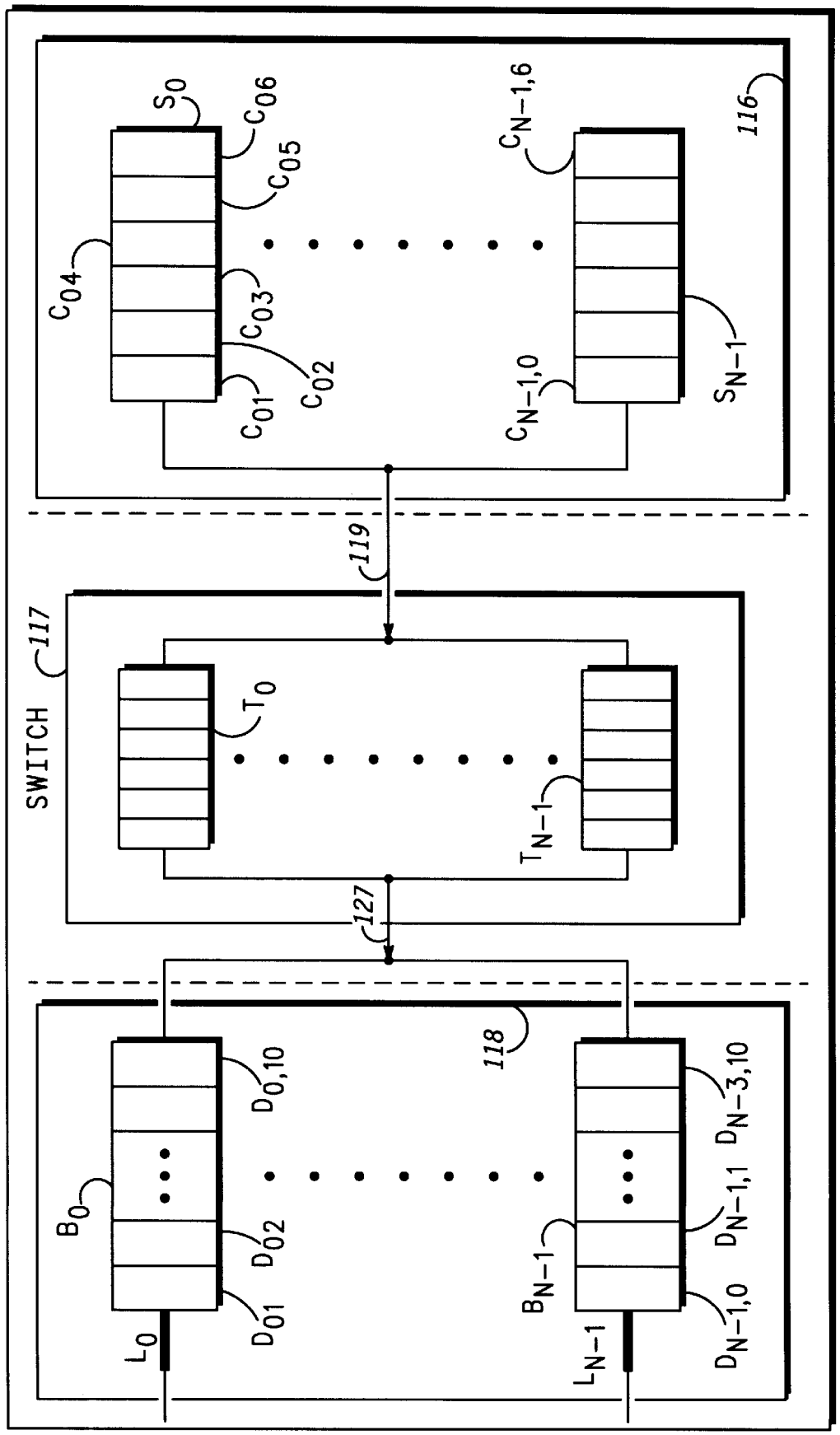
FIG. 4 shows a block diagram of a transfer switch according to a first embodiment of the invention.

As in the prior art, a cell residing in a cell queue stored in FIFO $S_x$ is always transferred to its assigned output buffer $B_x$ of the physical line $L_x$ to which it belongs. According to the preferred embodiment of the invention shown in FIG. 4 the cell emerging from the FIFO $S_x$ of the switch 116 is inputted via the cell bus 119 into its assigned transfer queue $T_x$. With other words the FIFOs $S_0, T_0, B_0; S_1, T1, B1; S_2, T_2, B_2; \ldots$; $S_{N-1}, T_{N-}, B_{N-1}$ constitute sets of three FIFOs. A cell is transferred from the switch 116 to the communication channels 118 exclusively making usage of the FIFOs of one set of FIFOs to which the specific cell belongs.

If a cell is stored for example in the storage location $C_{03}$ in the FIFO $S_0$ of the switch 116 then it will always be transferred to its assigned FIFOs $T_0$ of transfer layer 117 and $B_0$ of the communication channels 118 for transmission via the physical line $L_0$. Since in each of the transfer queues stored in the FIFOs $T_0$ to $T_{N-1}$, only cells are inputted emerging from the a specific one of the switch queues the occurrence of a head of queue blocking situation is excluded.

If for example the output buffer $B_0$ is full no more cells of the transfer queue stored in the FIFO $T_0$ of the transfer layer 117 can be outputted from the FIFO $T_0$. The cells of this transfer queue stored in the FIFO To have to wait until the buffer $B_0$ begins to empty so that there again is space for inputting of a new cell from the FIFO $T_0$ to the output buffer FIFO $B_0$. While all the cells in the cell queue of the FIFO $T_0$ are in a wait condition until there is space in the output buffer $B_0$ for input of new cells via the cell bus 127, the other output buffers $B_1$ to $B_{N-1}$ might not be full so that their corresponding cells can be outputted from the FIFO $T_1$ to $T_{N-1}$, via the cell bus 127 to their assigned output buffers.

Even though the cell queue of the FIFO $T_0$ is in a wait condition because of the FIFO $B_0$ being in a busy condition, the other cell queues stored in the other FIFOs $T_1$ to $T_{N-1}$, which are not in a wait condition can continue to be outputted to their assigned output buffers $B_1$ to $B_{N-1}$. Hence, in principal a head of queue blocking situation is excluded.

Figure 5:
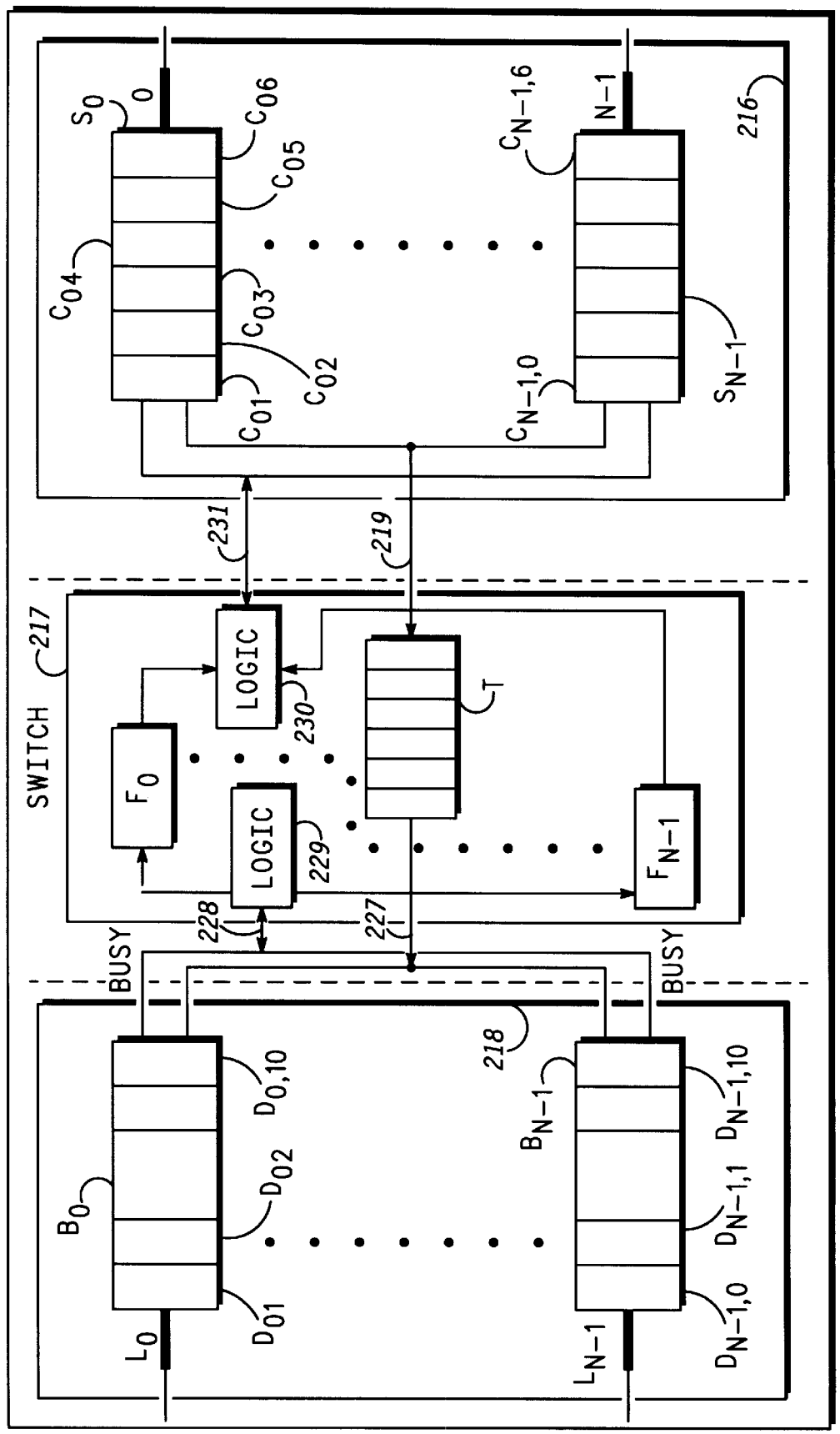
FIG. 5 shows a block diagram of a transfer switch according to a second embodiment of the invention.

With reference to FIG. 5 now the second embodiment of the invention is explained in more detail in the following. In FIG. 5 like reference numerals are used for parts corresponding to parts of the transfer switch of FIG. 3 having added a leading "2" to the reference numerals.

Figure 3:
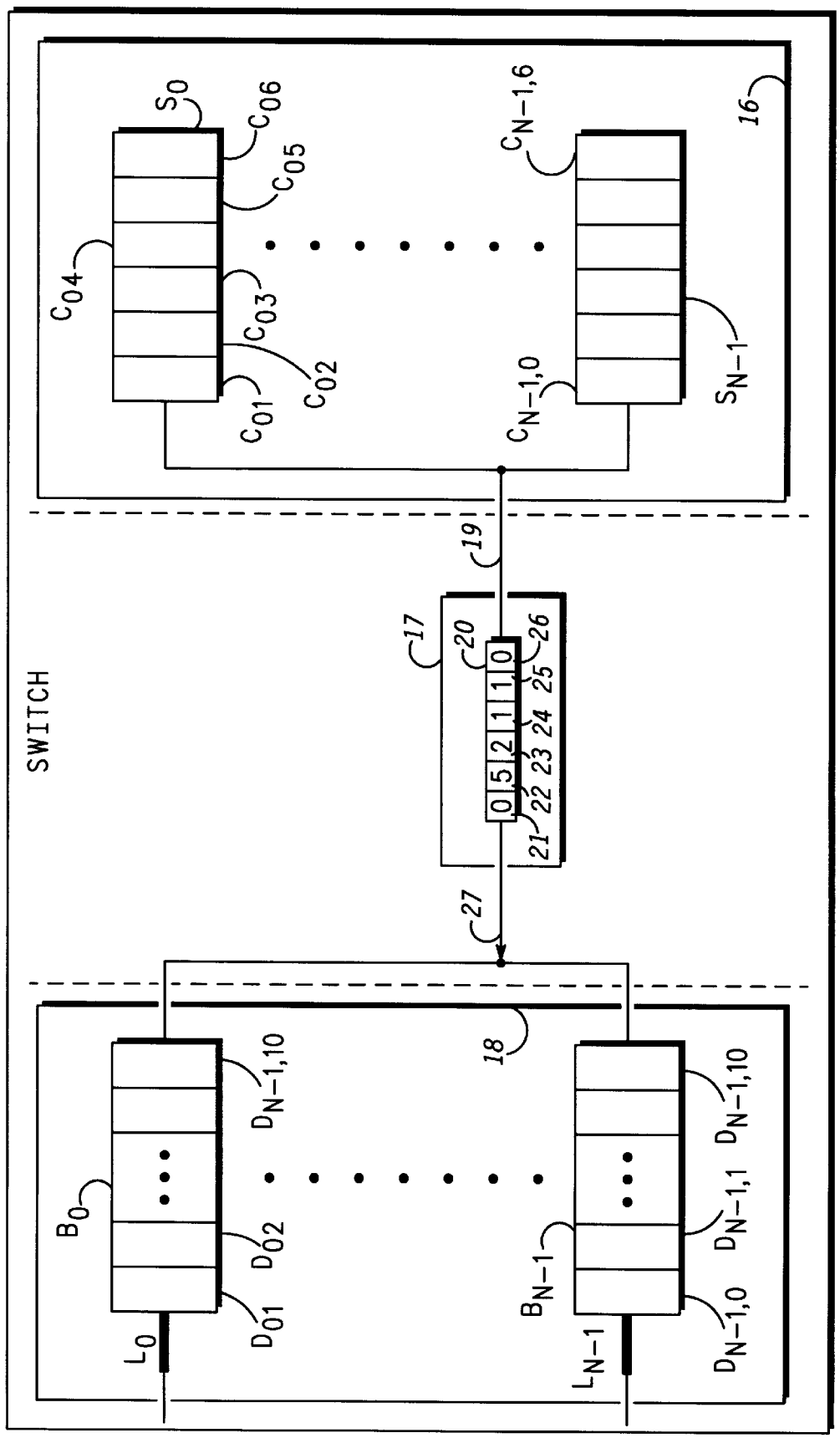
FIG. 3 shows a block diagram of a prior art ATM switch.

The transfer switch shown in FIG. 5 comprises a switch 216 and communication channels 218 which correspond to the switch 16 and the communication channels 18 of FIG. 3, respectively. The individual storage locations in the FIFOs of the switch 216 and of the communication channels 218 are referred to the same way as the corresponding storage locations shown in FIG. 3. The switch 216 is connected via a cell bus 219 to a transfer layer 217. The transfer layer 217 comprises a FIFO T which has a storage capacity sufficient for storage of a cell queue having a length of up to L cells. The input of the FIFO T is connected to the cell bus 219. The output of the FIFO T is connected via the cell bus 227 to the inputs of the FIFOs $B_0$ to $B_{N-1}$.

In addition the transfer layer 217 comprises logic circuitry 229 and logic circuitry 230. The logic circuitry 229 is connected via the busy bus 228 to the signal outputs of the FIFOs $B_0$ to $B_1$. The signal "busy" is issued at a signal output of one of the FIFOs of the communication channels 218 if this FIFO is in a busy condition. Each FIFO of the communication channels 218 has its own signal output to indicate such a busy condition. When the busy condition is over in a specific FIFO of the communication channel 218 the signal "busy" is dropped at the output of this FIFO.

The logic circuitry 229 has N outputs which are connected to a number N of flip flops $F_0$ to $F_{N-1}$. Only the flip flops $F_0$ and $F_{N-1}$ are shown in the drawing. The outputs of the flip flops $F_0$ to $F_{N-1}$ are connected to the logic circuitry 230. The output of the logic circuitry 230 is connected via the bus 231 to the disable inputs of the FIFOs $S_0$ to $S_{N-1}$.

If an output buffer FIFO $B_x$ of one of the FIFOs $B_0$ to $B_{N-1}$ is in a busy condition the signal output of that FIFO $B_x$ issues the signal "busy" which is transmitted via the bus 228 to the logic circuitry 229. In response to the reception of the "busy" signal from the FIFO $B_x$ the logic 229 issues a "set" signal to the flip flop $F_x$. Thereby the busy condition of the output buffer FIFO $B_x$ is stored in the FIFO $F_x$ which is one of the FIFOs $F_0$ to $F_{N-1}$. As a consequence the information that the FIFO $B_x$ is in a busy condition appears at the output of the flip flop $F_x$ and is transmitted to the logic circuitry 230. In response to the setting of the flip flop $F_x$ and the reception of the corresponding signal, the logic circuitry 230 issues a disable signal for the FIFO $S_x$ of one of the FIFOs $S_0$ to $S_{N-1}$. The reception of the disable signal by the FIFO $S_x$ disables the output of cells from the switch queue which is stored in the FIFO $S_x$ via the cell bus 219. As a consequence only cells from the other FIFOs of the switch 216 which are not disabled are inputted into the FIFO T of the transfer layer 217.

Thereby the risk of blocking the transfer queue stored in the FIFO T by cells originating from the FIFO $S_x$ is reduced. Hence, a head of queue blocking situation is unlikely to occur.

In the preferred embodiment of the invention shown in FIG. 5 the risk for a head of queue blocking situation is even reduced to zero for the following reasons:

Each of the output buffer FIFOs $B_0$ to $B_{N-1}$ has a storage capacity sufficient for a cell queue having a length of up to P cells, where in this case P=10. In the example considered here the FIFO T of the transfer layer 217 has a storage capacity for storage of a cell queue having a length of up to L cells, where L=6. A FIFO $B_x$ of one of them FIFOs $B_0$ to $B_{N-1}$ of the communication channels 218 is defined to be in a busy condition if a minimum number M of cells is stored in that specific FIFO $B_x$, where M is the difference between P and L which in this case is 4.

This means that as soon as there are at least four cells stored in the FIFO $B_x$ this FIFO is in a busy condition. The busy condition is signalled via the signal output of that specific FIFO $B_x$ via the busy bus 228 to the logic circuitry 229 which sets the flip flop $F_x$. As a consequence the logic circuitry 230 disables the FIFO $S_x$ of the switch 216 so that no more cells being assigned to the physical line $L_x$ and thus the FIFO $B_x$ are inputted into the FIFO T of the transfer layer 217.

With respect to a head of queue blocking situation the worst case in the example considered here is that the cell queue stored in the FIFO T of the transfer layer 217 exclusively consists of cells which are assigned to the FIFO $B_x$ of the communication channels 218 which is in a busy condition. Even in this case the FIFO $B_x$ has enough free storage locations, i.e. the storage locations $D_{x,5}$, $D_{x,6}$, $D_{x,7}$, ... $D_{x,10}$, to receive the cells which are waiting in the FIFO T for output via the cell bus 227 to the FIFO $B_x$. Hence, a head of queue blocking situation is excluded even in the worst case considered here.

If the transfer switch shown in FIG. 5 is to comply with the ATM standard a continuous flow of cells on the physical lines $L_0$ to $L_{N-1}$ has to be maintained under all circumstances. This means that even after the ending of a busy condition no discontinuity in the corresponding communication channel is allowable. In the example considered here the busy condition of the FIFO $B_x$ ends if there are only 3 cells stored in that FIFO on the storage locations $D_{x,1}$, $D_{x,2}$, $D_{x,3}$.

Subsequently the "busy" signal is dropped at the signal output of the FIFO $B_x$ so that the logic circuitry 229 causes the reset the flip flop $F_x$ and the logic circuitry 230 subsequently enables the input of cells being assigned to the physical line $L_x$ into the FIFO T again. To completely empty the FIFO $B_x$ from the three remaining storage cells it takes the time interval $T_1$; the time interval between the dropping of the "busy" signal and the input of a new cell in the FIFO $B_x$ is the time interval $T_2$.

In order to prevent the complete emptying of the FIFO $B_x$ it is required, that the time interval $T_2$ is shorter or equal to the time interval $T_1$. This is accomplished by choosing M taking into consideration the transmission rate on the physical lines $L_x$ as well as the transmission speed of the internal components of the switch, i.e. the busy bus 228, the logic 229, the flip flops F, the logic circuitry 230, the bus 231, the cell bus 219, the FIFO T and the cell bus 227. Thus the choice of M depends on the hardware characteristics of the switch as well as on the transmission rate of the physical lines.

It is to be noted that in practice the numbers L, M, P can be much larger than in the example considered above.

We claim:

1. A transfer layer adopted to be used between a switching means and a first number of communication channels, said switching means having first storage means for storage of said first number of switch queues, each of said communication channels having second storage means for storage of a cell queue having a first length of cells, each one of said second storage means being in a busy condition if a minimum number of cells is stored therein, where said minimum number is less than or equal to said first length, each of said communication channels being assigned to one of said switch queues, said transfer layer comprising:

third storage means for storage of a cell queue having a second length of cells and logic means for disabling input of a cell from one of said switch queues into said third storage means of said transfer layer if said second storage means of said assigned communication channel is in a busy condition.

2. The transfer layer according to claim 1 said logic means comprising first logic circuitry for monitoring said busy conditions of said second storage means.

3. The transfer layer according to claim 2 said transfer layer further comprising flip flop means for each of said second storage means to store a busy condition therein.

4. The transfer layer according to claim 3 said first logic circuitry being adapted to set said flip flop means of one of said second storage means in response to the detection of a busy condition.

5. The transfer layer according to claim 4 said logic means further comprising second logic circuitry adapted to issue a disable signal to said switching means in response to the setting of one of said flip flop means.

6. The transfer layer according to claim 1 said minimum number being equal to the difference of said first length and said second length.

7. The transfer layer according to claim 1 said minimum number being chosen so that after the ending of a busy condition no discontinuity in said corresponding communication channel occurs.

8. The transfer layer according to claim 7 said minimum number being chosen so that a first time interval required for emptying said second storage means having a cell queue of a third length equal to said minimum number stored therein is greater or equal to a second time interval required for transferring a cell from one of said switch queues to said second storage means after a said busy condition disappeared.

9. A transfer layer adopted to be used between a switching means and a first number of communication channels, said switching means having first storage means for storage of said first number of switch queues, each of said communication channels having second storage means for storage of a cell queue having a first length of cells, each one of said second storage means being in a busy condition if a minimum number of cells is stored therein, where said minimum number is less than or equal to said first length, each of said communication channels being assigned to one of said switch queues, said transfer layer comprising:
      third storage means having a storage capacity sufficient for storage of a cell queue having a second length of cells.

10. A transfer switch comprising a switching means and a first number of communication channels said switching means having first storage means for storage of said first number of switch queues, each of said communication channels having second storage means for storage of a cell queue having a first length of cells, each one of said second storage means being in a busy condition if a minimum number of cells is stored therein, where said minimum number is less than or equal to said first length, each of said communication channels being assigned to one of said switch queues, and a transfer layer between said switching means and said communication channels, said transfer layer comprising third storage means for storage of a cell queue having a second length of cells and logic means for disabling input of a cell from one of said switch queues into said third storage means of said transfer layer if said second storage means of said assigned communication channel is in a busy condition.

11. A method for operating of a transfer switch, said transfer switch comprising switching means, a first number of communication channels and a transfer layer, each of said communication channels having storage means for storage of a cell queue having a first length of cells, each one of said storage means being in a busy condition if a minimum number of cells is stored therein, where said minimum number is less than or equal to said first length, said method comprising the steps of:
      monitoring said storage means for an occurrence of said busy condition,
      disabling the input of a cell from said switching means to said transfer layer in response to said occurrence of said busy condition.

12. The method according to claim 11 said minimum number being equal to the difference of said first length and said second length, where said second length is a maximum length of a cell queue in said transfer layer.

13. The method according to claim 12 said minimum number being chosen so that after the ending of a busy condition no discontinuity in the corresponding communication channel occurs.

14. The method according to claim 12 said minimum number being chosen so that a first time interval required for emptying said storage means having a cell queue of a length equal to said minimum number stored therein is greater or equal to a second time interval required for transferring a cell from said switching means to said storage means after a said busy condition disappeared.

15. A method for operating of a transfer switch, said transfer switch comprising switching means, a number N of communication channels and a transfer layer, each of said communication channels having second storage means for storage of a cell queue, each of said communication channels being assigned to one of said switch queues, said transfer layer comprising third storage means for storage of cell queues, each one of said cell queues being assigned to one of said communication channels and having a length of up to L cells, said method comprising the steps of:
      inputting cells from said switch queues into said assigned cell queues.

16. A method for operating of a transfer switch, said transfer switch comprising switching means, a first number of communication channels and a transfer layer, said switching means having said first number of first storage means for storage of said first number of switch queues, each of said communication channels having a second storage means for storage of a cell queue, each of said second storage means being assigned to one of said switch queues, said transfer layer comprising said first number of third storage means for storage of cell queues, each one of said third storage means being assigned to one of said first storage means, said transfer layer being coupled between said switching means and said communication channels, said method comprising the steps of:
      outputting one of said cells from one of said first storage means;
      inputting said one of said cells into one of said third storage means of said transfer layer which is assigned to said one of said first storage means, so that a head of queue blocking is prevented; and
      outputting said one of said cells from said one of said third storage means into said assigned second storage means.

* * * * *